(12) United States Patent
Giammaria

(10) Patent No.: US 6,604,237 B1
(45) Date of Patent: Aug. 5, 2003

(54) APPARATUS FOR JOURNALING DURING SOFTWARE DEPLOYMENT AND METHOD THEREFOR

(75) Inventor: Alberto Giammaria, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/460,854

(22) Filed: Dec. 14, 1999

(51) Int. Cl.[7] ............................................. G06F 9/445
(52) U.S. Cl. ...................... 717/174; 717/174; 717/176; 707/203; 707/511
(58) Field of Search ................................ 717/168, 170, 717/171, 172, 173, 174, 176, 177, 178, 116, 120, 108, 175; 707/203, 511

(56) References Cited

U.S. PATENT DOCUMENTS

| | | | |
|---|---|---|---|
| 4,523,206 A | 6/1985 | Sasscer ........................ | 364/200 |
| 4,697,266 A | 9/1987 | Finley ......................... | 371/12 |
| 4,875,162 A * | 10/1989 | Ferriter et al. ................ | 705/29 |
| 5,367,643 A | 11/1994 | Chang et al. ................. | 395/325 |
| 5,446,874 A | 8/1995 | Waclawsky et al. ......... | 395/575 |
| 5,448,230 A | 9/1995 | Schanker et al. ...... | 340/870.03 |
| 5,455,934 A | 10/1995 | Holland et al. .............. | 395/404 |
| 5,457,683 A | 10/1995 | Robins ......................... | 370/60 |
| 5,566,306 A | 10/1996 | Ishida .......................... | 395/309 |
| 5,572,678 A | 11/1996 | Homma et al. ......... | 395/200.12 |
| 5,586,256 A | 12/1996 | Thiel et al. ............. | 395/200.03 |
| 5,590,124 A | 12/1996 | Robins ......................... | 370/258 |
| 5,680,602 A | 10/1997 | Bloem et al. ................ | 395/601 |
| 5,701,482 A | 12/1997 | Harrison et al. ............. | 395/675 |
| 5,724,516 A | 3/1998 | Temoshenko .......... | 395/200.32 |
| 5,754,763 A | 5/1998 | Bereiter .................. | 395/187.01 |
| 5,799,323 A | 8/1998 | Mosher, Jr. et al. ........ | 707/202 |
| 5,805,920 A | 9/1998 | Sprenkle et al. ............. | 395/821 |
| 5,819,083 A | 10/1998 | Chen et al. .................. | 395/610 |
| 5,930,798 A * | 7/1999 | Lawler et al. ............... | 707/102 |
| 6,223,343 B1 * | 4/2001 | Hopwood et al. ........... | 717/101 |
| 6,347,397 B1 * | 2/2002 | Curtis ......................... | 717/170 |
| 6,351,850 B1 * | 2/2002 | Van Gilluwe et al. ...... | 717/175 |
| 6,374,401 B1 * | 4/2002 | Curtis ......................... | 717/170 |
| 6,385,766 B1 * | 5/2002 | Doran, Jr. et al. .......... | 717/170 |
| 6,490,723 B1 * | 12/2002 | Bearden et al. ............. | 717/174 |
| 6,510,466 B1 * | 1/2003 | Cox et al. ................... | 709/229 |
| 6,526,447 B1 * | 2/2003 | Giammaria ................. | 709/232 |

FOREIGN PATENT DOCUMENTS

| | | |
|---|---|---|
| EP | 0 192 120 | 8/1986 |
| EP | 0 711 088 | 5/1996 |

(List continued on next page.)

OTHER PUBLICATIONS

Dashofy et al., An infrastructure for the rapid development of XML based architecture description languages, ACM ICSE, pp 266–276, 2002.*

(List continued on next page.)

*Primary Examiner*—Anil Khatri
(74) *Attorney, Agent, or Firm*—Barry S. Newberger; Winstead Sechrest & Minick P.C.; Leslie A. Van Leeuwen

(57) ABSTRACT

A method and apparatus for automatically generating a log, or journal, during the deployment of software packages to client systems on a network are implemented. The logs may be used to verify the deployment and facilitate selectively deployment of components not successfully deployed. The mechanism rests on an object-oriented architecture that provides a multiplicity of actions that effects software management operations on the target system. The actions are implemented as methods within the object oriented architecture. In this way, each software element, for example, registry entries, files, directories, etc., which may be implicated in a software deployment are treated on an equal footing. The mechanism automatically generates a log file based on the actions contained within the particular deployment package.

17 Claims, 4 Drawing Sheets

FOREIGN PATENT DOCUMENTS

| | | |
|---|---|---|
| EP | 0 871 123 | 10/1998 |
| IE | 66464 | 4/1994 |
| IE | 940318 | 4/1994 |
| JP | 7-50673 | 2/1995 |
| JP | 9-331323 | 12/1997 |
| SU | 1741145 A2 | 6/1992 |
| WO | WO 97/15018 | 4/1997 |
| WO | WO 97/38624 | 10/1997 |

OTHER PUBLICATIONS

Hall et al., A cooperative approach to support software deployment using the software dock, ACM ICSE, pp 174–183, 1999.*

Hoek et al., "Versioned software architecture", ACM ISA, pp 73–76, 1998.*

Hoek, "Configurable software architecture in support of configuartion management and software deployment", ACM ICSE, pp 732–733, 1999.*

"Error Handler Activation Procedure," *IBM Technical Disclosure Bulletin*, vol. 37 No. 08, Aug. 1994, pp. 231–232.

"Transferring Bulk Data in Message Queueing System," *IBM Technical Disclosure Bulletin*, vol. 41 No. 01, Jan. 1998, pp. 437–438.

"Execution Time Dynamic Data Collection at First Detection of Failure," *IBM Technical Disclosure Bulletin*, vol. 37 No. 06B, Jun. 1994, pp. 391–392.

"'Variable Paged Array' Datatype," *IBM Technical Disclosure Bulletin*, vol. 37 No. 07, Jul. 1994, pp. 89–92.

"Distributing a Document Using a Regional Reference," *IBM Technical Disclosure Bulletin*, vol. 33 No. 3A, Aug. 1990, p. 251.

"Using Data Link Control–Level Feedback to Control Application Buffer Usage and Packet Loss," *IBM Technical Disclosure Bulletin*, vol. 41 No. 01, Jan. 1998, pp. 199–204.

"Dynamic Determination of Network Topology," *IBM Technical Disclosure Bulletin*, vol. 38 No. 03, Mar. 1995, pp. 411–418.

"Pointer Collection and Reporting for Error Recovery Procedures Branching," *IBM Technical Disclosure Bulletin*, vol. 39 No. 07, Jul. 1996, pp. 87–90.

"Hybrid Switch Control Scheme for Fast Point–to–Point/Multicast/Hunt–Group Connection Setup," *IBM Technical Disclosure Bulletin*, vol. 37 No. 11, Nov. 1994, pp. 641–646.

"Flow Control of Prioritized Data in a Multimedia Communications System," *IBM Technical Disclosure Bulletin*, vol. 37 No. 01, Jan. 1994, pp. 531–532.

"Distributed Object Encapsulation of Customer Information Control System Distributed Transaction Processing," *IBM Technical Disclosure Bulletin*, vol. 38 No. 01, Jan. 1995, pp. 177–180.

"Reconciliation of Shadowed Mail Items with Master," *IBM Technical Disclosure Bulletin*, vol. 33 No. 6B, Nov. 1990, pp. 120–121.

"Riadata—An Automated Retain Incident Analysis Facility," *IBM Technical Disclosure Bulletin*, vol. 34 No. 10A, Mar. 1992, pp. 278–283.

Cao G. et al., "Low–cost Checkpointing with Mutable Checkpoints in Mobile Computing Systems," International Conference on Distributed Computing Systems, 18th, Amsterdam, May 26–29, 1998, Proceedings, pp. 464–471.

Wiener, J.L. et al., "OODB Bulk Loading Revisited: the Partitioned–list Approach," International Conference on Very Large Data Bases, 21st, Zurich, Sep. 11–15, 1995, Proceedings of VLDB '95, pp. 30–41.

Muntz, D.A. et al., "Evaluating Delayed Write in a Multi-level Caching File System," IFIP/IEEE International Conference on Distributed Platforms, [Dresden, Feb. 27–Mar. 1, 1996], Proceedings: Client/Server and Beyond, pp. 415–429.

Jakoby, A. et al., "Data Transmission in Processor Networks," International Workshop on Distributed Algorithms, 9th, Proceedings, of WDAG '95, pp. 145–159.

Joshi, A. et al., "On Disconnected Browsing of Distributed Information," International Workshop on Research Issues in Data Engineering, 7th, Birmingham, UK, Apr. 7–8, 1997, Proceedings: High Performance Database Management for Large–scale Applications, pp. 101–107.

Saglietti, F., "Dynamic Decision on Checkpointing by Use of Reduced Ordered Binary Decision Diagrams," International Conference on Computer Safety, Reliability and Security, 16th, York, UK, Sep. 7–10, 1997, [Proceedings of] Safecomp '97.

* cited by examiner

APPARATUS FOR JOURNALING DURING SOFTWARE DEPLOYMENT AND METHOD THEREFOR

CROSS REFERENCE TO RELATED APPLICATIONS

Related subject matter may be found in the following commonly assigned, U.S. Patent Applications which are hereby incorporated by reference herein:

Ser. No. 09/460,855, entitled "APPARATUS FOR DATA DEPOTING AND METHOD THEREFOR";

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR";

Ser. No. 09/438,436, entitled "APPARATUS FOR CONNECTION MANAGEMENT AND METHOD THEREFOR";

Ser. No. 09/458,268, entitled "COMPUTER NETWORK CONTROL SYSTEMS AND METHODS";

Ser. No. 09/460,852, entitled "METHODS OF DISTRIBUTING DATA IN A COMPUTER NETWORK AND SYSTEMS USING THE SAME";

Ser. No. 09/458,269, entitled "SYSTEMS AND METHODS FOR REAL TIME PROGRESS MONITORING IN A COMPUTER NETWORK; and Ser. No.09/460,851, entitled "APPARATUS FOR AUTOMATICALLY GENERATING RESTORE PROCESS DURING SOFTWARE DEPLOYMENT AND METHOD THEREFOR".

TECHNICAL FIELD

The present invention relates in general to data processing systems, and in particular, to data processing system apparatus and methods for the deployment of software packages to client systems.

BACKGROUND INFORMATION

Typical data processing methodologies for installing, updating and maintaining software on client systems are based on a simple "copy files and execute scripts" model. In other words, files to be deployed are copied from a server storage area, in accordance with a script, and downloaded to the target client, also in accordance with the script. A script is a sequence of instructions that is interpreted by the scripting language program. Generally, scripts take longer to run than a compiled program, and are typically better suited for programs of limited capability, or that can reuse and tie together existing compiled programs.

With increasing sophistication of data processing systems, generally, and in the operating systems associated therewith, the process of installing or updating software, that is, software deployment, has become much more complex. In addition to merely typing lines of text, installation software must be able to handle registry entries, INI file entries, folders, and shortcuts, for example. The registry, within the Windows™ operating system context, for example, is an operating system database that contains information about the operating system, its applications, and file associations. The registry holds both hardware and software information. The installation software must be able to modify information within the registry data base. Similarly, INI files hold configuration information for applications installed on the data precessing system. Installation software must also be able to modify entries in INI files. Shortcuts are icons presented on the desktop that may be used to provide quick access to the associated application. Installation software must be able to install shortcut information associated with a particular application that is being installed so that the operating system can link the shortcut and the application, as well as display the shortcut on the desktop.

The aforementioned scripting methodologies are complicated to use with a complex configuration process demanded by modern data processing software. For example, the Microsoft® Office 95 installation program adds, in order of magnitude, a thousand registry entries and several tens of shortcuts. When such large numbers of entries are involved, the scripting methodologies are prone to error, complicating the task of generating the installation software. Additionally, software deployment typically requires that multiple actions be taken on the target machine. Often, an install operation is also accompanied by the need to remove files and entries, as well as the installation of the software elements. This adds to the complexity of the process for generating the required scripts.

Thus, there is need in the art for mechanisms to manage the deployment of software. In particular, there is a need for methods and apparatus for automatically generating software useable for restoring a target system to its original state following a software installation procedure, and additionally, there is a need for apparatus and methods to automatically generate the restoration software during the deployment process.

SUMMARY OF THE INVENTION

The aforementioned needs are addressed by the present invention. Accordingly, there is provided, in a first form, a journaling method. The method includes entering an identifier corresponding to an action contained in a software deployment package in a file, and entering a return value returned by a method included in an interface of the action, wherein the return value is a member of a predetermined set of return values. Each return value of the set is operable for determining a status of the action and determining a behavior of the control flow on the deployment package.

There is also provided, in a second form, a computer program product. The computer program product is in a machine readable storage medium, and includes programming for performing method steps for journaling during deployment of a software package. The method steps include entering an identifier corresponding to an action contained in a software deployment package in a log file, and entering a return value returned by a method included in an interface of the action, in which the return value is a member of a predetermined set of return values. Each return value of the set is operable for determining a status of the action and determining a behavior of the control flow on the deployment package.

Additionally, there is provided, in a third form, a data processing system. The system contains circuitry for journaling during deployment of a software package. The circuitry includes circuitry operable for entering an identifier corresponding to an action contained in a software deployment package in a file, and circuitry operable for entering a return value returned by a method included in an interface of the action, in which the return value is a member of a predetermined set of return values. Each return value of the set is operable for determining a status of the action and determining a behavior of the control flow on the deployment package.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
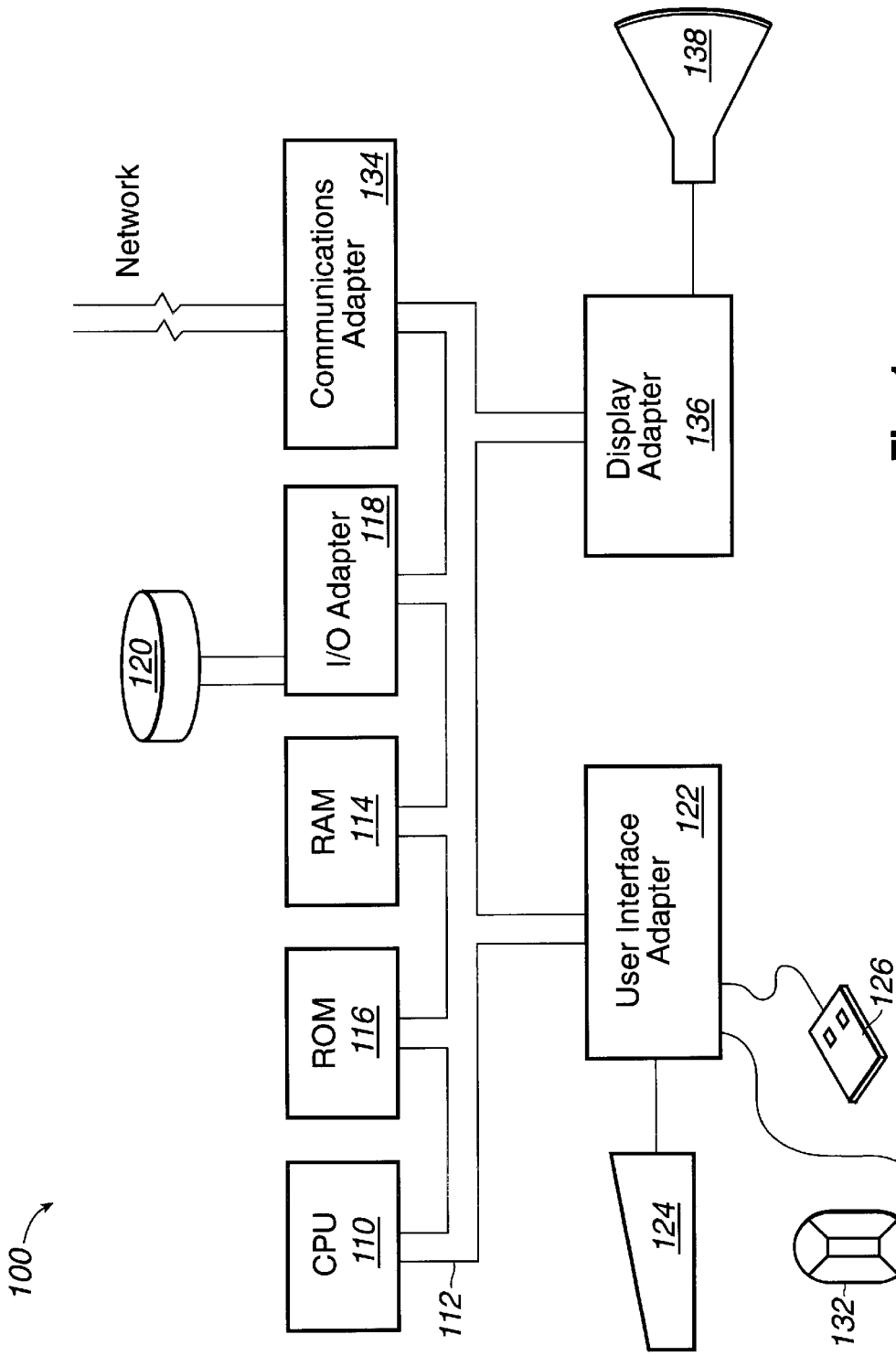
FIG. 1 illustrates, in block diagram form, a data processing system in accordance with an embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides a mechanism for automatically generating a log, or journal, during the deployment of software packages to client systems on a network. The logs may be used to verify the deployment and facilitate selectively deployment of components not successfully deployed. The mechanism rests on an object-oriented architecture that provides a multiplicity of actions that effects software management operations on the target system. The actions are implemented as methods within the object oriented architecture. In this way, each software element, for example, registry entries, files, directories, etc., which may be implicated in a software deployment are treated on an equal footing. The mechanism automatically generates a log file based on the actions contained within the particular deployment package.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 are all interconnected to bus 112 via user interface adapter 122. Display monitor 138 is connected to system bus 112 by display adapter 136. Additionally, an operating system coordinates operation of the components of system 100.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120 ). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements. Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
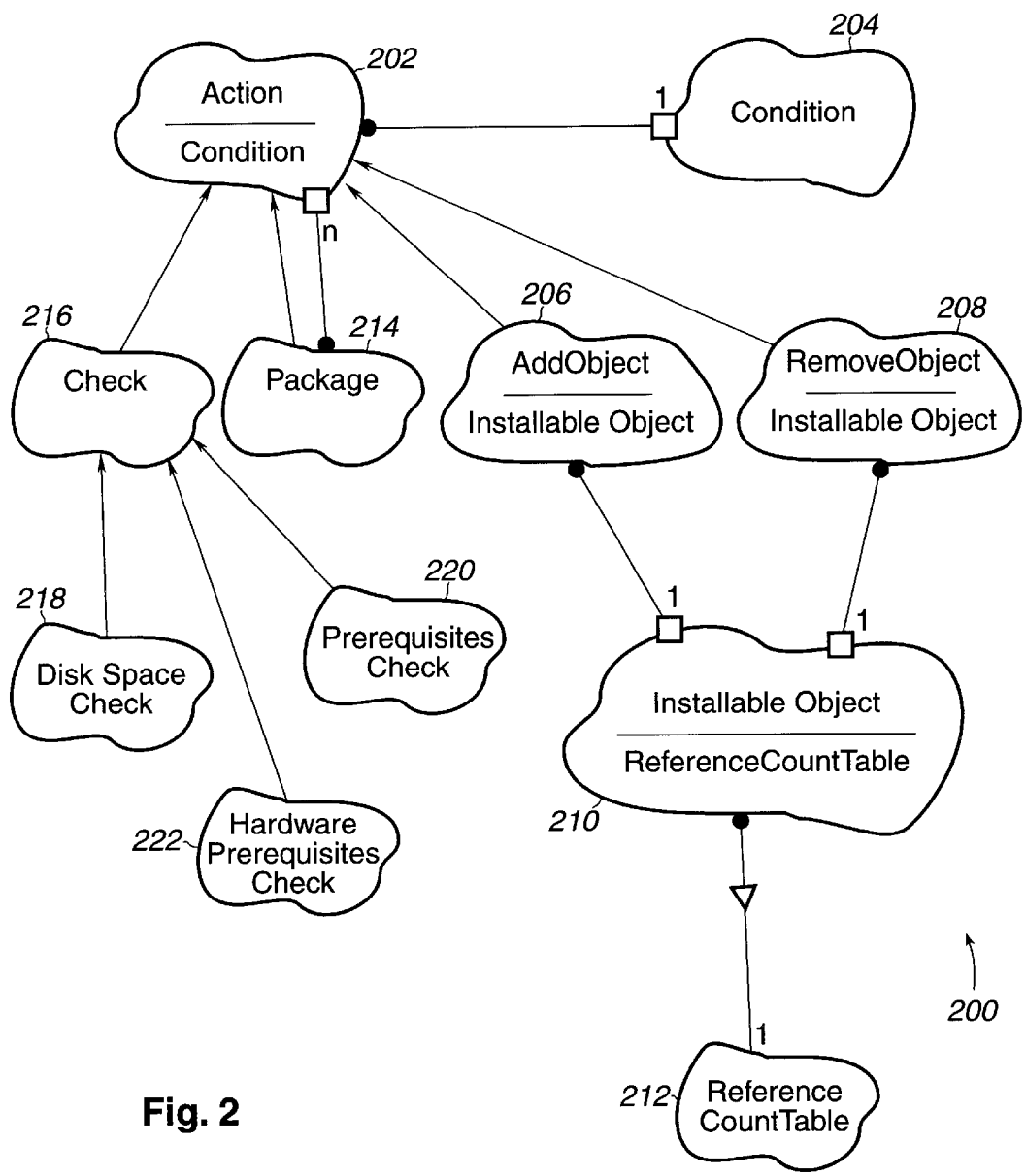
FIG. 2 schematically illustrates an object-oriented software architecture which may be used with the present invention.

FIG. 2 illustrates a high level diagram of an object-oriented software architecture which may be used with the present invention. (In FIG. 2, derived classes are indicated by an arrow directed to the classes from which they inherit, and aggregation, or composition, is shown using line segments having a filled circle denoting the container object and an open square denoting the contained object(s).) The common behavior of any action allowed in the deployment of a software package are defined by the Action class 202. Action class 202 is an abstract base class. The interface of the Action class 202 consists of a set of methods. These are summarized in Table 1:

TABLE 1

| Method | Effect |
| --- | --- |
| execute | Executes the action |
| reverse | Executes the opposite of the execute operation |
| undo | Returns the system prior to the execution of the last operation |
| accept | Relinquishes all the resources needed to provide undo-ability of the last operation |
| commit | Commits all updates of the last operation |
| verify | Verifies the successful execution of the last operation |
| check_execute | Verifies that it is possible to perform the execute operation |
| check_reverse | Verifies that it is possible to perform the reverse operation |
| check_undo | Verifies that it is possible to perform undo operation |
| check_commit | Verifies that it is possible to perform the commit operation |
| backup | Back up any resource that will be modified to enable returning target to original state |

Although all of the methods may be used during the deployment of a particular software package, in building a program to return a client to an unmodified state, not all methods may be needed. The methods of the Action class 202 that are pertinent to the present invention will be discussed further in conjunction with FIG. 3.

Each of the methods of the Action class 202 return values which may determine a specific behavior of the operation flow control on the deployment package. These are summarized in Table 2:

TABLE 2

| Return Value | Flow Control Effect |
| --- | --- |
| success | Continue to next action in the package. |
| success, reboot now | Reboot immediately and continue to next action in the package. |
| success, reboot now and execute again | Reboot immediately and execute the operation again on this action. |
| success, reboot after | Continue to next action in the package and reboot after all action in the package have been executed. |
| success, reboot after and execute again | Continue to next action, reboot after all actions in the package have been executed and execute the operation again on this action. |
| warning | Continue to next action if stop_on_warning = false, stop execution if stop_on_warning = "true." |
| temporary_failure | The operation cannot proceed because of temporary errors that can disappear executing the operation in transactional mode. Continue to next action if stop_on_error = false, stop execution if stop_on_error = "true." |
| permanent_failure | The operation cannot proceed because of permanent errors. Continue to next action if stop_on_error = "false," stop execution if stop_on_error "true." |
| fatal_failure | Stop execution. |

Return values which affect the flow of the methodology of the present invention, will be described below in conjunction with FIG. 3.

Each action instance can have an associated condition that defines whether operations on that action should be skipped. The abstract Condition Class 204 defines the common behaviors of any conditions which may be allowed. Condition Class 204 exists for convenience in defining classes which inherit from the abstract Action class 202. Conditions are useful, for example, when in the same deployment package there are actions specific to target operating systems and it is desired that the specific actions be executed only on the corresponding target systems. Thus, for example, if in the same software deployment package there are Windows™ 95 and UNIX® actions, and it is desired that Windows™95 actions be executed only on Windows™95 targets, and UNIX® actions be executed only on UNIX® targets.

The concrete AddObject class 206 and the concrete RemoveObject class 208 respectively represent an action that adds an object to a target, and an action that removes an object from a target. Each of these concrete classes is a derived class of the abstract Action class 202. The AddObject class 206 and RemoveObject class 208 each, include, as a member, the InstallableObject class 210. The InstallableObject class 210 is an abstract class that represents an object that can be added, replaced or removed from a target. Subclasses, or, equivalently, derived classes of the InstallableObject class 210, may include, for example, text file objects, file system objects, Windows™ registry objects, and Windows™ INI file objects.

The AddObject class 206 and RemoveObject class 208 implement all of their respective action operations on top of the InstallableObject interface. The correspondence, or mapping, of the methods of the AddObject class 206 and the RemoveObject class 208 are shown in Tables 3 and 4, respectively:

TABLE 3

| AddObject method | InstallableObject method |
| --- | --- |
| execute | add |
| reverse | remove |
| verify | is_identical |
| check_execute | check_add |
| check_reverse | check_remove |

TABLE 4

| RemoveObject method | InstallableObject method |
| --- | --- |
| execute | remove |
| reverse | no action |
| verify | not exit |
| check_execute | check_remove |
| check_reverse | no action |

Note that, the methods of the AddObject class 206 and RemoveObject class 208 include methods inherited from the base Action class 202.

The interface of the InstallableObject class on top of which the AddObject class 206 and RemoveObject class 208 implement their respective methods are summarized in Table 5:

TABLE 5

| Name | Action Operation |
| --- | --- |
| add | Adds the object to the target. |
| remove | Removes the object from the target. |
| check_add | Verifies that is possible to perform the add operation. |

TABLE 5-continued

| Name | Action Operation |
| --- | --- |
| check_remove | Verifies that it is possible to perform the remove operation. |
| is_identical | Indicates whether an object with the same properties is already present on the target. |
| is_newer | Indicate whether an object with the same name but newer is already on the target. |

The InstallableObject class 210 includes, as a member, the reference count table class 212. Instances of installable objects, which are derived from the InstallableObject class 210 as discussed above, may belong to more than one software package. The number of the reference count table class belonging to an instance of an installable object tracks the number of active packages that refer to that particular installable object. The reference count table associates names of installable objects with the number of active packages that use them.

Packages are instances of the package class 214. Instances of the package class 214 represent the lowest level of software objects that can be operated on by the software administration utilities defined within architecture 200. A package is a container of actions as indicated in FIG. 2, showing that a package may be composed of, or aggregate, n action class objects. A package represents the smallest object that may be installed, although an administrator may install a "bundle" of packages. An exemplary package will be discussed below in conjunction with FIG. 3. An instance of the package class 214 may include a plurality of members derived from the Action class 202.

Additionally, there is provided the CheckClass 216. This provides an interface to perform additional checks other than those implemented for each single action, such as the check$_{13}$ execute, and check$_{13}$ reverse methods of the Action-Class 202, referred to in Table 1. For example, it may be desirable to determine if there is enough disk space for executing an operation on an entire package, or launching a dialogue to ask the user for authorization to proceed with a certain operation on a given package. Exemplary concrete subclasses of the CheckClass 216 include the DiskSpaceCheck class 218, the PrerequisiteCheck class 220 and the HardwarePrerequisiteCheck class 222.

Figure 3:
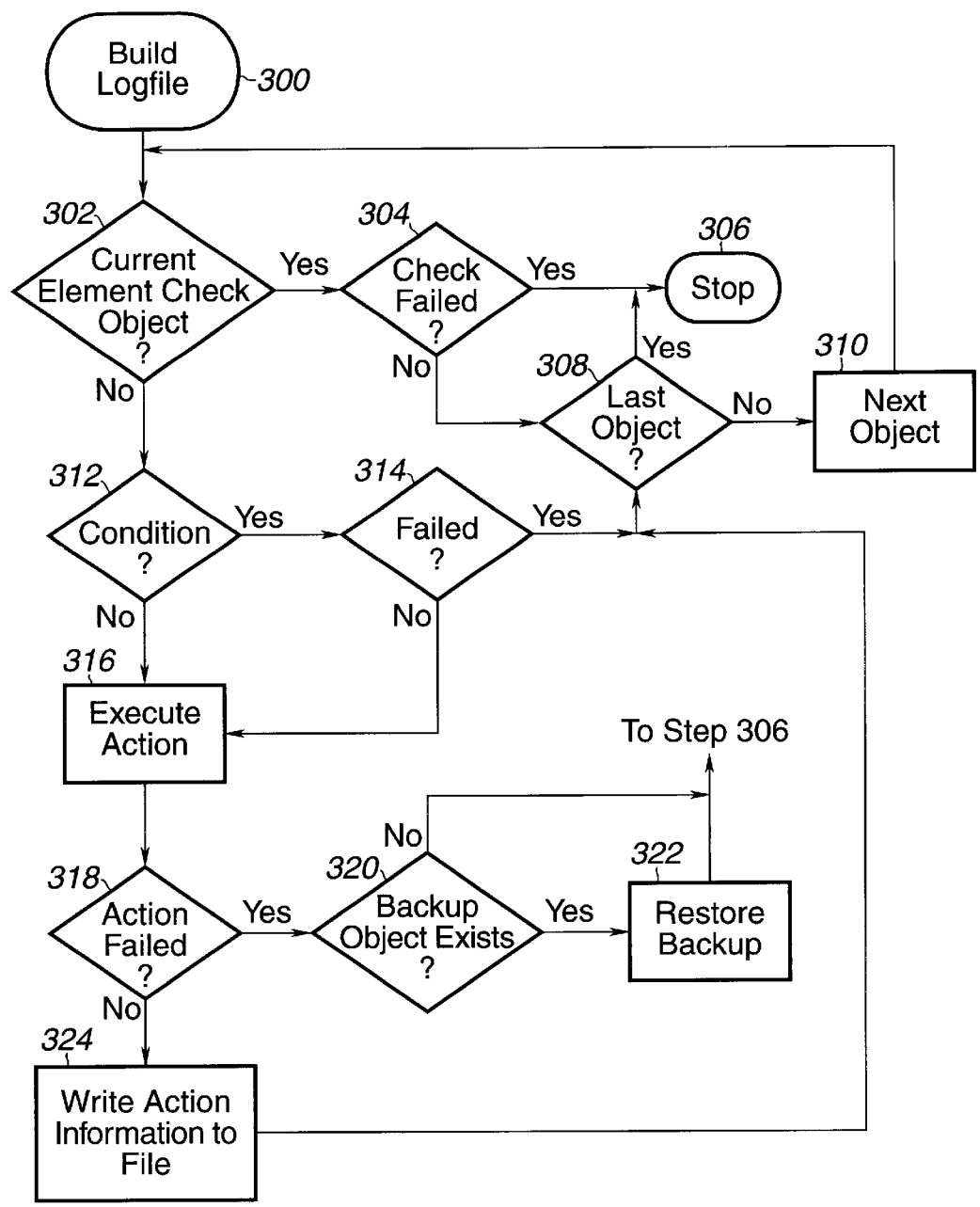
FIG. 3 illustrates, in flowchart form, a journaling methodology in accordance with an embodiment of the present invention.

Referring now to FIG. 3, there is illustrated a flowchart for a methodology procedure 300 for generating a log, or journal, for a deployed software package. Procedure 300 generates a log via the interfaces provided in architecture 200 of FIG. 2.

In step 302, it is determined if a current object in the package is a Check object. If so, it is then determined, step 304, if the Check failed. In an embodiment of the present invention in accordance with the architecture in FIG. 2, a failure may be indicated by a return value of a method of Check Class 218, returning one of the return values corresponding to an unsuccessful result, as discussed above in conjunction with FIG. 2 and Table 2. If the Check has failed, then methodology 300 terminates in step 306. Otherwise, if the Check is successful, in step 308 it is determined of the current object is the last object in the package. If so, methodology 300 also terminates, step 306. Otherwise methodology 300 proceeds to the next object in the package, step 310.

If, in step 302 it is determined that the current object is not a check object, the current object is an action, and in step 312 it is determined if the action contains a Condition. Recall that, Action Class 202, FIG. 2, is a container class for an object of the Condition Class 204. The interface of Condition Class 204 may include an evaluate method for evaluating the condition. If in deploying a package, the current action evaluates a condition, via the evaluate method, for example, the methodology 300, in step 312 will proceed by the "Yes" branch to step 314. If the condition fails, which may be indicated, in an embodiment of the present invention in accordance with the architecture of FIG. 2, by one of the unsuccessful return values, then methodology 300 returns to step 308, discussed above. Otherwise, is step 314, the condition is successful, and methodology 300 proceeds to step 316. Step 316 may also be reached from step 312 if the current action does not contain a condition object, and in step 316 the current action is executed. In an embodiment of the present invention implemented in accordance with the architecture described in conjunction with FIG. 2, the current action may be executed via the execute method of the interface of the AddObject Class 206.

In step 318, it is determined if the action executed in step 316 failed. Failure of the action may be indicated, in an embodiment of the present invention in accordance with the architecture of FIG. 2, by one of the unsuccessful return values in TABLE 2. If the action failed, then, in step 320 it is determined if a backup object exists, and if so, the client system is restored via the backup. Methodology 300 then terminates in step 306. If, the backup does not exist, step 320, methodology 300 terminates without restoring the client system.

Returning to step 318, if the action was successful, the action information is written to the log, or journaling, file in step 324. Recall that in an embodiment of the present invention in accordance with the architecture of FIG. 2, a successful action may return one of the corresponding return values in TABLE 2. Information that may be written to the file includes, for example, the action name, the source path of the object that is the subject of the action and the target path of the object. The information in the log file may then be used to verify the status of a deployed package.

Methodology 300 may be further understood by considering a concrete example, in pseudocode form, of a simple distribution package, for adding files to a target:

```
Package{
    DiskSpaceCheck{
        c:\prog_files ≧ 40 MB
    }
    condition{
        OS == WinNT
        addFile{
            source_name = c:\source_dir\WinNTprog_1
            target_name = c:\prog_files\WinNTprog_1
        }
    }
    condition{
        OS == Win95
        addFile{
            source_name = c:\source_dir\Win95prog_1
            target_name = c:\prog_files\Win95prog_1
        }
    }
}
```

Recall that a Package is a container for Action class objects, and the first action in the exemplary package is a CheckClass method, DiskSpaceCheck, discussed hereinabove in conjunction with CheckClass 216. If the result of the DiskSpaceCheck action is successful, that is there is sufficient space on the target for the file to be added, then the remaining actions in the Package are executed. Otherwise the execution of the distribution package terminates. The Package also includes two AddFile actions may be implemented, in accordance with the architecture of FIG. 2 by invoking, for the corresponding file objects, the execute method of the AddObject Class 206 interface as previously described in conjunction with FIG. 2. Execution of the AddFile actions are conditioned on the operating system of the target. If the target operating system is WindowsNT™, the first condition above is satisfied, and the corresponding AddFile action will be taken to add the file WinNTprog$_{13}$ 1 to the target system. Alternatively, if the target operating system is Windows95™, the second AddFile action will be taken to add the file WinNTprog__1 of the target systel.. If however, the target operating system is neither WindowsNT™ nor Windows95 ™, the Package takes no action. Thus, in methodology 300, if the operating system of the target is WindowsNT™, the first condition above will return successfully in step 312, but not the second. Then, in step 318, a file, WinNTprog__1, exists on the target, it will be backed up in step 320, and an AddObject action directed to the backup will be generated in step 322. Otherwise, in step 324 of methodology 300, a RemoveObject action directed to the file with target system path c: \prog__ files\WinNTprog__1 will be generated and inserted in the program being built. Conversely, if the target operating system is Windows95 ™ the corresponding operations will be performed with respect to the file object Win95prog__1.

Figure 4:
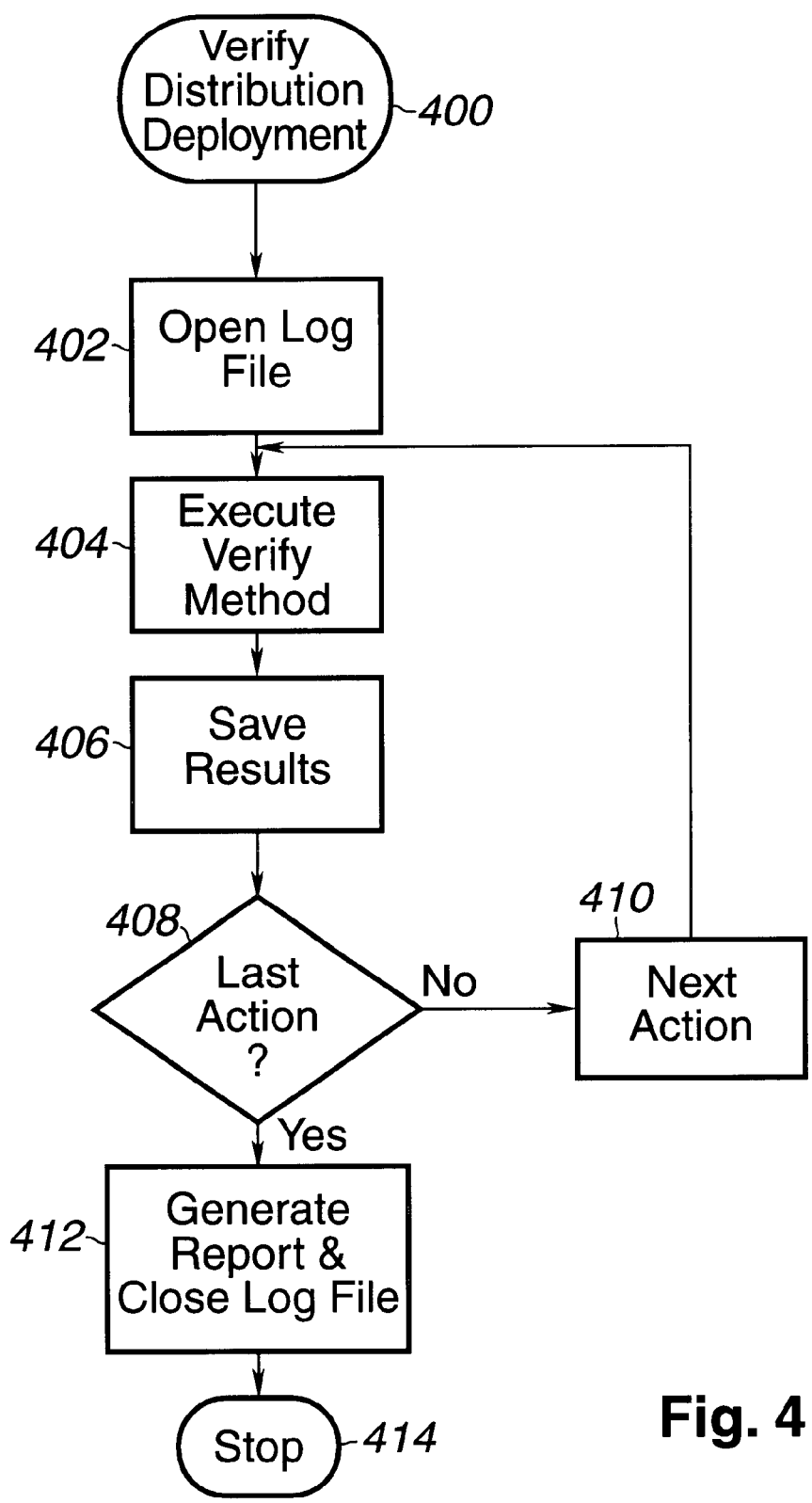
FIG. 4 illustrates, in flowchart form, a verification methodology in accordance with an embodiment of the present invention.

Refer now to FIG. 4 illustrating, in flow chart form, a verification methodology 400 in accordance with the principles of the present invention. In step 402, the log file for the distribution to be verified is opened, and, in step 404 a verification method is executed for the current action in the file. In an embodiment of the present invention implemented in accordance with the architecture described in conjunction with FIG. 2, the current action may be executed via the verify method of the interface of the corresponding class. Thus, for example, if the current action is an AddObject action, the verify method of AddObject Class 206 may be used. The verify method of the AddFile action checks that the file exists on the target and determines the attributes of the file, for example, file size and checksum. Similarly, if the current action is a RemoveObject action, the verify method of RemoveObject Class 208 may be used.

In step 406 the results of the verify method are saved. For example, if the current object is an AddFile action, the results may include the target file paths, and a status message. If the file that was added was not verified to exist on the target system, the status message may be, for example, FAILED-FILE DOES NOT EXIST.

In step 408, it is determined if the current action is the last action in the log file. If not, methodology 400 proceeds to the next action, step 410, and continues to loop over all of the actions in the log file, verifying each. Then, after the last action is verified, in step 412 a report of the result saved in step 406 is generated, and the log file closed. By referring to the report, a system administrator may determine errors in a distribution, and take corrective action. After generating the report, methodology 400 terminates in step 414.

Although the present invention and its advantages have been described in detail, it should be understood that various changes, substitutions and alterations can be made herein without departing from the spirit and scope of the invention as defined by the appended claims.

What is claimed is:

1. A journaling method comprising the steps of:
   executing an action;
   determining if said action was successful;
   writing a plurality of information values in a file in response to said step of determining if said action was successful;
   determining if said action includes a condition;
   if said action includes a condition, determining if said condition failed; and
   bypassing said steps of executing said action, determining if said action was successful and writing said plurality of information if said condition failed.

2. A method of the claim 1 further comprising:
   determining if a backup object exists in response to a failure of said action; and
   restoring a target system using said backup object.

3. The method of claim 1 further comprising the step of repeating said executing, determining and writing steps for a plurality of actions included in a software deployment package.

4. The method of claim 1 wherein said plurality of information values includes an object source path and an object target path.

5. The method of claim 1 wherein the action is an object of an action class, and wherein the action class includes a plurality of methods, a first method of the plurality comprising a method operable for executing the action, and a second method of the plurality of methods operable for verifying that it is possible to execute the action.

6. The method of claim 5 wherein the action class includes a check subclass, a method of the check subclass comprising a method operable for performing a check as a condition precedent to executing the action.

7. A program product embodied in a storage medium including programming for journaling comprising instructions for:
   executing an action;
   determining if said action was successful;
   writing a plurality of information values in a file in response to said step of determining if said action was successful;
   determining if said action includes a condition;
   if said action includes a condition, determining if said condition failed; and
   bypassing said steps of executing said action, determining if said action was successful and writing said plurality of information if said condition failed.

8. The program product of claim 7 further comprising instructions for:
   determining if a backup object exists in response to a failure of said action; and
   restoring a target system using said backup object.

9. The program product of claim 7 further comprising instructions for repeating said executing, determining and writing steps for a plurality of actions included in a software deployment package.

10. The program product of claim 7 wherein said plurality of information values includes an object source path and an object target path.

11. The computer program product of claim 7 wherein the action is an object of an action class, and wherein the action class includes a plurality of methods, a first method of the plurality comprising a method operable for executing the action, and a second method of the plurality of methods operable for verifying that it is possible to execute the action.

12. The computer program product of claim 11 wherein the action class includes a check subclass, a method of the check subclass comprising a method operable for performing a check as a condition precedent to executing the action.

13. A data processing system comprising:

circuitry operable for executing an action;

circuitry operable for determining if said action was successful; and circuitry operable for writing a plurality of information values in a file in response to said step of determining if said action was successful;

circuitry operable for determining if a backup object exists in response to a failure of said action; and circuitry operable for restoring a target system using said backup object.

14. A data processing system comprising:

circuitry operable for executing an action;

circuitry operable for determining if said action was successful; and circuitry operable for writing a plurality of information values in a file in response to said step of determining if said action was successful;

circuitry operable for determining if said action includes a condition;

circuitry operable for, if said action includes a condition, determining if said condition failed; and circuitry operable for bypassing said steps of executing said action, determining if said action was successful and writing said plurality of information if said condition failed.

15. The data processing system of claim 14 further comprising circuitry operable for repeating said executing, determining and writing steps for a plurality of actions included in a software deployment package.

16. The data processing system of claim 14 wherein said plurality of information values includes an object source path and an object target path.

17. The data processing system of claim 14 wherein the action is an object of an action class, and wherein the action class includes a plurality of methods, a first method of the plurality comprising a method operable for executing the action, and a second method of the plurality of methods operable for verifying that it is possible to execute the action.

* * * * *